(12) United States Patent
Takamura et al.

(10) Patent No.: US 11,613,676 B2
(45) Date of Patent: Mar. 28, 2023

(54) ADHESIVE TAPE

(71) Applicant: NITTO DENKO CORPORATION, Osaka (JP)

(72) Inventors: Yuichi Takamura, Osaka (JP); Yoshinari Takayama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 147 days.

(21) Appl. No.: 17/258,941

(22) PCT Filed: Jul. 10, 2019

(86) PCT No.: PCT/JP2019/027341
§ 371 (c)(1),
(2) Date: Jan. 8, 2021

(87) PCT Pub. No.: WO2020/017413
PCT Pub. Date: Jan. 23, 2020

(65) Prior Publication Data
US 2021/0340409 A1  Nov. 4, 2021

(30) Foreign Application Priority Data
Jul. 17, 2018 (JP) .............................. JP2018-134063

(51) Int. Cl.
*C09J 183/04* (2006.01)
*C09J 7/40* (2018.01)
(Continued)

(52) U.S. Cl.
CPC . *C09J 7/38* (2018.01); *C09J 7/24* (2018.01); *C09J 7/30* (2018.01); *C09J 7/40* (2018.01);
(Continued)

(58) Field of Classification Search
CPC ......... C09J 7/38; C09J 7/24; C09J 7/30; C09J 7/40; C09J 183/04; C09J 2301/122;
(Continued)

(56) References Cited

U.S. PATENT DOCUMENTS 3,929,704 A * 12/1975 Horning .................. C08L 83/04
428/447
4,016,328 A *  4/1977 Horning ..................... C09J 7/38
428/355 R
(Continued)

FOREIGN PATENT DOCUMENTS

JP    H02-191641    7/1990
JP    H03-064381    3/1991
(Continued)

OTHER PUBLICATIONS

ISR issued in WIPO Patent Application No. PCT/JP2019/027341, dated Aug. 6, 2019, English translation.
(Continued)

*Primary Examiner* — Patricia L. Nordmeyer
(74) *Attorney, Agent, or Firm* — Greenblum & Bernstein, P.L.C.

(57) ABSTRACT

An adhesive tape includes: a substrate made of a fluorine resin; and a silicone-based adhesive agent layer disposed on one surface of the substrate. The adhesive tape has a thickness of 50 μm or more. An adhesive strength of an adhesive surface to the other surface of the substrate after a friction test is 4.0 N/19 mm or more. The friction test is performed according to a test method for coefficient of friction specified in JIS K7125: 1999, and performed in a state where: a contact surface, of a sliding piece used in the test method, brought into contact with a surface to be tested is covered with a single fiber cloth (cotton, for friction) specified in JIS L0803: 2011; the other surface of the
(Continued)

substrate is defined as the surface to be tested; and the number of times of reciprocation is set to 10 times.

8 Claims, 3 Drawing Sheets

(51) Int. Cl.
*C09J 7/30* (2018.01)
*C09J 7/38* (2018.01)
*C09J 7/24* (2018.01)

(52) U.S. Cl.
CPC ....... *C09J 183/04* (2013.01); *C09J 2301/122* (2020.08); *C09J 2301/312* (2020.08); *C09J 2427/006* (2013.01); *C09J 2483/00* (2013.01); *Y10T 428/14* (2015.01); *Y10T 428/1429* (2015.01)

(58) Field of Classification Search
CPC ............ C09J 2301/312; C09J 2427/006; C09J 2483/00; C09J 7/245; Y10T 428/14; Y10T 428/1429; B32B 27/30
See application file for complete search history.

(56) References Cited

U.S. PATENT DOCUMENTS

| | | | | |
|---|---|---|---|---|
| 5,248,739 A | * | 9/1993 | Schmidt | C08L 83/00 428/447 |
| 5,254,644 A | * | 10/1993 | Kobori | C08L 83/00 528/31 |
| 5,366,809 A | * | 11/1994 | Schmidt | C09J 183/04 428/452 |
| 5,441,811 A | * | 8/1995 | Lin | C09J 183/04 524/588 |
| 2004/0157064 A1 | * | 8/2004 | Aoki | C09J 183/04 428/447 |
| 2006/0189777 A1 | * | 8/2006 | Aoki | C08L 83/00 525/477 |
| 2013/0224475 A1 | | 8/2013 | Tagawa et al. | |
| 2015/0375607 A1 | | 12/2015 | Tanaka et al. | |

FOREIGN PATENT DOCUMENTS

| | | |
|---|---|---|
| JP | H08-253740 | 10/1996 |
| JP | 2003-313516 | 11/2003 |
| JP | 2009-096817 A | 5/2009 |
| JP | 2012-117054 | 6/2012 |
| JP | 2012-233189 | 11/2012 |
| WO | 2013/181431 A1 | 12/2013 |

OTHER PUBLICATIONS

IPRP issued in WIPO Patent Application No. PCT/JP2019/027341, dated Jan. 19, 2021, English translation.
Extended European Search Report issued in EP Patent Application No. 19838448.9, dated Mar. 14, 2022.

* cited by examiner

ADHESIVE TAPE

TECHNICAL FIELD

The present invention relates to an adhesive tape including a substrate made of a fluorine resin.

BACKGROUND ART

One of the artificial lift methods in oil fields is a method (ESP lift) using an electric pump (Electric Submersible Pump). As shown in FIG. 4, in the ESP lift, an ESP assembly 108 including a pump 105, an intake 106, and a motor 107 is inserted into a well 101 extending deep underground. Crude oil 102 in the well 101 is pushed up to the ground surface via an oil lift pipe 109 by the pump 105 driven by the motor 107. A control device 103 for the motor 107 and the motor 107 are normally connected to each other by a power cable 104 disposed on the outer peripheral surfaces of the oil lift pipe 109 and the ESP assembly 108.

The interior of the well 101 is in a harsh environment involving exposure to high temperatures and crude oil components, especially at the deepest part where the ESP assembly 108 is inserted. Therefore, the power cable 104 is likely to be damaged. The damaged power cable 104 is generally lifted from the well 101 and then repaired on site. At that time, an adhesive tape is used to reconnect a power line of the power cable 104 from which the damaged part has been cut and removed. Since resistance to the above-mentioned harsh environment is required, it is conceivable to use an adhesive tape including a substrate made of a fluorine resin.

Patent Literature 1 discloses an adhesive tape including a substrate that is a fluorine resin film and has an adhesive agent coating surface subjected to a surface treatment for improving the joining property with an adhesive agent. In addition, Patent Literature 2 discloses an adhesive tape that includes a substrate made of a fluorine resin and has a certain adhesive strength to its back surface.

CITATION LIST

Patent Literature

Patent Literature 1: JP H8-253740 A
Patent Literature 2: JP 2012-233189 A

SUMMARY OF INVENTION

Technical Problem

Repairing the power cable 104 requires an adhesive tape having a high own-backside adhesive strength. This is to stably maintain a state of being wound around the power line. However, the back surface of the adhesive tape is normally formed of a substrate. In the case where the substrate is made of a fluorine resin, it is difficult to ensure a high own-backside adhesive strength. Moreover, for a reason described later, it is particularly difficult to ensure a high own-backside adhesive strength at the site of ESP lift. It is difficult for the adhesive tapes disclosed in Patent Literatures 1 and 2 to satisfy the required characteristics.

An object of the present invention is to provide an adhesive tape suitable for various applications that require stably maintaining a wound state after actual winding work, for example, for repairing a power cable through which power is supplied to an ESP assembly.

Solution to Problem

The present invention provides an adhesive tape including: a substrate made of a fluorine resin; and a silicone-based adhesive agent layer disposed on one surface of the substrate, wherein
a surface of the silicone-based adhesive agent layer which is opposite to a substrate side surface of the layer forms an adhesive surface,
the adhesive tape has a thickness of 50 μm or more,
an adhesive strength of the adhesive surface to the other surface of the substrate after a friction test is 4.0 N/19 mm or more, and
the friction test is performed according to a test method for coefficient of friction specified in Japanese Industrial Standards (hereinafter, referred to as "JIS") K7125: 1999, and performed in a state where:
 a contact surface, of a sliding piece used in the test method, brought into contact with a surface to be tested is covered with a single fiber cloth (cotton, for friction) specified in JIS L0803: 2011;
 the other surface of the substrate is defined as the surface to be tested; and
 the number of times of reciprocation is set to 10 times.

Advantageous Effects of Invention

As a result of studies for the reason why it is particularly difficult to ensure a high own-backside adhesive strength at the site of ESP lift, the present inventors have found that one of the factors is that the adhesive tape is used while being in contact with gloves and protective clothing of workers, various devices, and tools, etc. For example, when winding the adhesive tape around a repair part of a power cable, the back surface of the adhesive tape (surface opposite to the adhesive surface) is normally rubbed many times by gloves of a worker. On the other hand, in the adhesive tape of the present invention, the adhesive strength of the adhesive surface to the back surface (that is, own-backside adhesive strength) is maintained at a predetermined value or more even after a predetermined friction test for the back surface.

Therefore, the adhesive tape according to the present invention is suitable for various applications that require stably maintaining a wound state after actual winding work, for example, for repairing a power cable through which power is supplied to an ESP assembly.

DESCRIPTION OF EMBODIMENTS

Hereinafter, embodiments of the present invention will be described with reference to the drawings. The present invention is not limited to the embodiments described below.

[Adhesive Tape]

Figure 1:
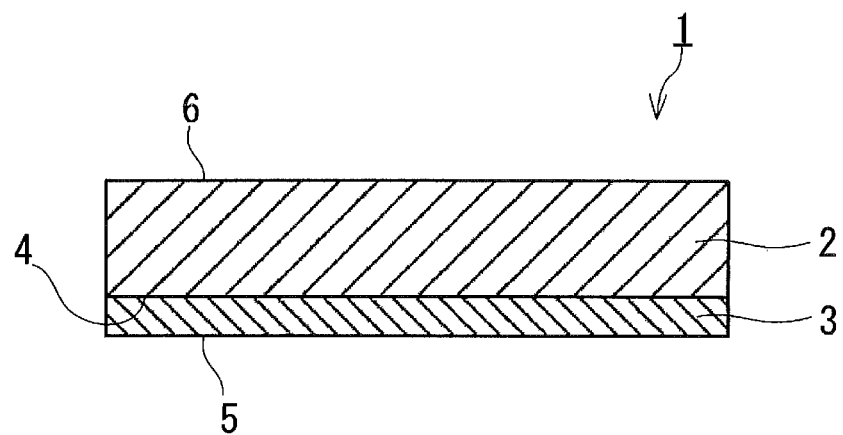
FIG. 1 is a cross-sectional view schematically showing an example of the adhesive tape of the present invention.

FIG. 1 shows an example of the adhesive tape of the present invention. The adhesive tape 1 shown in FIG. 1 includes a substrate 2 and an adhesive agent layer 3. The substrate 2 is made of a fluorine resin. The adhesive agent layer 3 is a silicone-based adhesive agent layer, and is disposed on one surface 4 of the substrate 2. The surface, of the adhesive agent layer 3, opposite to the surface on the substrate 2 side of the adhesive agent layer 3 forms an adhesive surface 5 of the adhesive tape 1. The adhesive tape 1 includes a fluorine resin substrate having excellent heat resistance and chemical resistance, and a silicon-based adhesive agent layer having excellent heat resistance and chemical resistance.

The thickness of the adhesive tape 1 is 50 μm or more. The thickness of the adhesive tape 1 may be more than 50 μm, 60 μm or more, 70 μm or more, 80 μm or more, or even 90 μm or more. The upper limit of the thickness of the adhesive tape 1 is, for example, 300 μm or less. When the thickness of the adhesive tape 1 is within these ranges, sufficient strength and adhesive strength during use in various applications can be obtained more reliably. In the present description, when an "adhesive strength" is simply described for the adhesive tape 1, the adhesive strength does not mean an own-backside adhesive strength, but means the adhesive strength between the adhesive tape 1 and an object to which the adhesive tape 1 is attached.

Moreover, in the adhesive tape 1, as for the adhesive strength of the adhesive surface 5 to the other surface (back surface) 6 of the substrate 2 (own-backside adhesive strength), the value after a predetermined friction test is 4.0 N/19 mm or more. The predetermined friction test means a friction test which is performed according to the test method for friction test specified in JIS K7125: 1999, and performed in the below conditions. A contact surface, of a sliding piece used in the test method, brought into contact with a surface to be tested is covered with a single fiber cloth (cotton, for friction) specified in JIS L0803: 2011. The other surface (back surface) 6 of the substrate is defined as the surface to be tested. The number of times of reciprocation in the friction test is set to 10 times. It should be noted that the coefficient of friction of the other surface 6 is not measured and thus it is not necessary to calculate the coefficient of friction itself in the above friction test. In the present description, hereinafter, the above friction test is referred to simply as "friction test". The own-backside adhesive strength of the adhesive tape 1 after the friction test may be 4.5 N/19 mm or more, 4.8 N/19 mm or more, 5.0 N/19 mm or more, or even 5.2 N/19 mm or more. The upper limit of the own-backside adhesive strength of the adhesive tape 1 after the friction test is, for example, 8.0 N/19 mm or less.

The own-backside adhesive strength of the adhesive tape 1 can be measured according to "Method 2" in the test method for adhesive strength specified in JIS Z0237: 2009, with the test temperature set to 25° C.±1° C. If the width of a test piece is not 19 mm, the measurement may be performed with the current width, and the measured value may be converted into a value per 19 mm width. In addition, since a silicone-based adhesive agent generally has excellent wettability, the number of times of reciprocation of a roller for pressure-bonding a first test piece and a second test piece to each other may be one time, and not two times as specified in "Method 2".

The fluorine resin forming the substrate 2 is, for example, at least one resin selected from among polytetrafluoroethylene (PTFE), polyvinylidene fluoride (PVDF), perfluoroalkoxy alkane (PFA), a polytetrafluoroethylene-polyhexafluoropropylene copolymer (FEP), and an ethylene-polytetrafluoroethylene copolymer (ETFE). The fluorine resin is preferably PTFE since PTFE has particularly excellent heat resistance and chemical resistance.

The substrate 2 may be substantially made of a fluorine resin, or may contain a material other than a fluorine resin if necessary. Examples of the material include additives such as: coloring agents; antistatic agents; and fillers such as glass fiber, polyimide, and aromatic polyester. In the case where the substrate 2 contains an additive, the content of the additive in the substrate 2 is, for example, 10 weight % or less, and may be 5 weight % or less, 3 weight % or less, or even 2 weight % or less. In the case where the adhesive tape 1 is for repairing a power cable, the additive is preferably formed of a material having low conductivity (for example, an electric resistivity of $10^5$ Ω·cm or more) or an insulating material (for example, an electric resistivity of $10^{12}$ Ω·cm or more).

The thickness of the substrate 2 is, for example, 25 μm or more, and may be 30 μm or more, 40 μm or more, or even 50 μm or more. When the thickness of the substrate 2 is within these ranges, sufficient strength during use in various applications can be obtained more reliably. The upper limit of the thickness of the substrate 2 is, for example, 250 μm or less, and may be 230 μm or less or even 180 μm or less. When the thickness of the substrate 2 is excessively large, the handleability of the adhesive tape 1 may decrease.

Examples of the shape of the substrate 2 include polygons such as squares and rectangles, and band shapes. However, the shape of the substrate 2 is not limited to these examples. With a polygonal substrate 2, it is possible to produce a polygonal adhesive tape 1. With a band-shaped substrate 2, it is possible to produce a band-shaped adhesive tape 1. The length and the width of the substrate 2 can be set freely.

Examples of the silicone-based adhesive agent forming the adhesive agent layer 3 include the adhesive agents (including the adhesive agents disclosed as comparative examples) disclosed in JP 2003-313516 A. However, the silicone-based adhesive agent is not limited to these examples.

The silicone-based adhesive agent generally contains a condensate and/or crosslinking reaction product of a silicone gum and a silicone resin. The blending ratio (weight ratio) of the silicone gum and the silicone resin in the silicone-based adhesive agent, including the adhesive agent disclosed in JP 2003-313516 A, is preferably silicone gum:silicone resin=150:100 to 100:150. When the blending ratio of the silicone gum and the silicone resin is within the above range, a silicone-based adhesive agent having high adhesive strength and high-temperature cohesive force can be obtained. The blending ratio can be determined from the amounts of the silicone gum and the silicone resin at the time before causing a condensation reaction and a crosslinking reaction to proceed. As the high-temperature cohesive force of the adhesive agent becomes higher, for example, the heat resistance holding power of the adhesive tape 1 improves more.

The thickness of the adhesive agent layer 3 is, for example, 15 to 60 μm, and may be 20 to 55 μm or 30 to 50 μm. When the thickness of the adhesive agent layer 3 is within these ranges, sufficient adhesive strength and heat resistance holding power during use in various applications can be obtained more reliably.

Examples of the shape of the adhesive tape 1 include polygons such as squares and rectangles, and band shapes. However, the shape of the adhesive tape 1 is not limited to these examples. A polygonal adhesive tape 1 can be distributed as a flat sheet, and a band-shaped adhesive tape 1 can be distributed as a wound body wound around a winding core. The width of the band-shaped adhesive tape 1 and the width of the wound body obtained by winding the band-shaped adhesive tape 1 can be set freely.

The adhesive strength at ordinary temperature (25° C.) of the adhesive tape 1 is, for example, 5.0 N/19 mm or more, and may be 5.5 N/19 mm or more, 5.8 N/19 mm or more, 6.0 N/19 mm or more, or even 6.2 N/19 mm or more, as represented by a 180° peeling adhesive strength evaluated according to "Method 1" in the test method for adhesive strength specified in JIS Z0237: 2009 (hereinafter, referred to as an "ordinary temperature adhesive strength"). The upper limit of the ordinary temperature adhesive strength of the adhesive tape 1 is, for example, 8.0 N/19 mm or less. The ordinary temperature adhesive strength of the adhesive tape 1 can be measured with the test temperature set to 25° C.±1° C., according to the above "Method 1". If the width of a test piece is not 19 mm, the measurement may be performed with the current width, and the measured value may be converted into a value per 19 mm width. In addition, for the above reason, the number of times of reciprocation of a roller for pressure-bonding the test piece to a test plate may be one time, and not two times as specified in "Method 1".

The adhesive strength at high temperature (250° C.) of the adhesive tape 1 is, for example, 0.8 N/19 mm or more, and may be 1.0 N/19 mm or more, 1.2 N/19 mm or more, 1.4 N/19 mm or more, or even 1.5 N/19 mm or more, as represented by a 180° peeling adhesive strength evaluated in an environment of 250° C. (hereinafter, referred to as a "high temperature adhesive strength"). The upper limit of the high temperature adhesive strength of the adhesive tape 1 is, for example, 3.0 N/19 mm or less. The high temperature adhesive strength of the adhesive tape 1 can be measured in the same manner as the ordinary temperature adhesive strength, except that the test piece is peeled from the test plate in an environment of 250° C.±5° C.

In the adhesive tape 1, the ratio $A_{B2}/A_{B1}$ of an own-backside adhesive strength $A_{B2}$ after the friction test to an own-backside adhesive strength $A_{B1}$ before the friction test (own-backside adhesive strength maintenance rate) is, for example, 70% or more, and may be 80% or more, 90% or more, 95% or more, 98% or more, or even 99% or more. The adhesive tape 1 in which the own-backside adhesive strength maintenance rate is within these ranges is particularly suitable for use in various applications that require stably maintaining a wound state after winding work.

A holding power at high temperature (250° C.) (hereinafter, referred to as "heat resistance holding power") of the adhesive tape 1 is, for example, 1.00 mm or less, and may be 0.70 mm or less, 0.50 mm or less, 0.30 mm or less, or even 0.15 mm or less, as represented by a "displacement distance" measured according to the test method for holding power specified in JIS Z0237: 2009. The lower limit of the displacement distance is, for example, 0.01 mm or more. The displacement distance is a value measured in an environment of 250° C.±5° C. when the width of a test piece is 10 mm, the contact area between the test piece and a test plate is 10 mm in width×20 mm in length, and the mass of a weight is 200 g. In addition, for the above reason, the number of times of reciprocation of a roller for pressure-bonding the test piece to the test plate may be one time, and not two times as specified in the above method.

The adhesive tape 1 may be an adhesive tape having excellent terminal peeling resistance characteristics in which, when a tape width is 5 mm and the tape is wound around a round bar having a diameter of 3 mm with a winding tension of 50 gf, terminal peeling does not occur in air at 25° C. (condition A), preferably under the condition A and in air at 250° C. (condition B), more preferably under the condition A, under the condition B, and in oil at 220° C. (condition C). In the present description, the terminal peeling means a phenomenon that the winding end portion of the adhesive tape is peeled off when the adhesive tape is wound multiple times.

Figure 2:
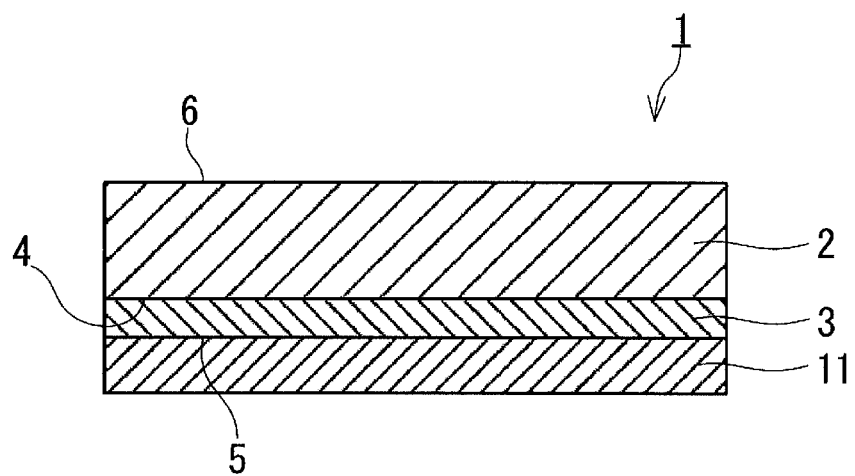
FIG. 2 is a cross-sectional view schematically showing another example of the adhesive tape of the present invention.

The adhesive tape 1 may include a material and/or a layer other than the substrate 2 and the adhesive agent layer 3. The layer that can be further included in the adhesive tape 1 is, for example, a separator 11 that is laminated on the substrate 2 and the adhesive agent layer 3 so as to be in contact with the adhesive surface 5 (see FIG. 2). The separator 11 is normally peeled off when the adhesive tape 1 is used. The separator 11 may be the same as a separator included in a known adhesive tape. The surface, of the separator 11, which is in contact with the adhesive agent layer 3 may be subjected to a peeling treatment. The separator 11 is formed of, for example, a resin or paper. Examples of the resin include polyester resins such as polyethylene terephthalate (PET), and polyolefin resins such as polyethylene and polypropylene.

Figure 3:
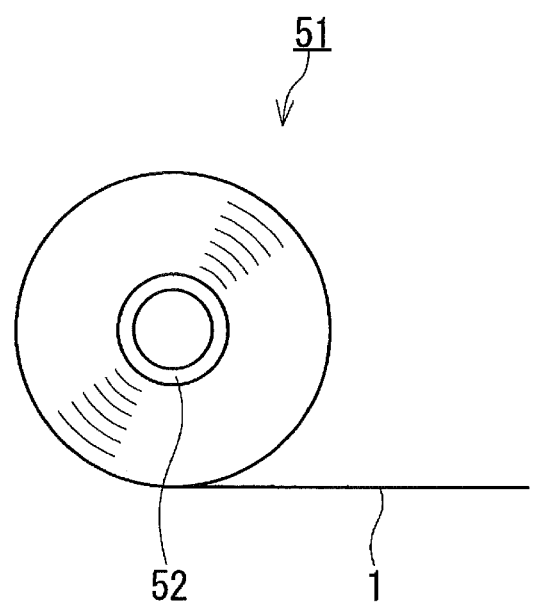
FIG. 3 is a schematic diagram showing still another example of the adhesive tape of the present invention.
Figure 4:
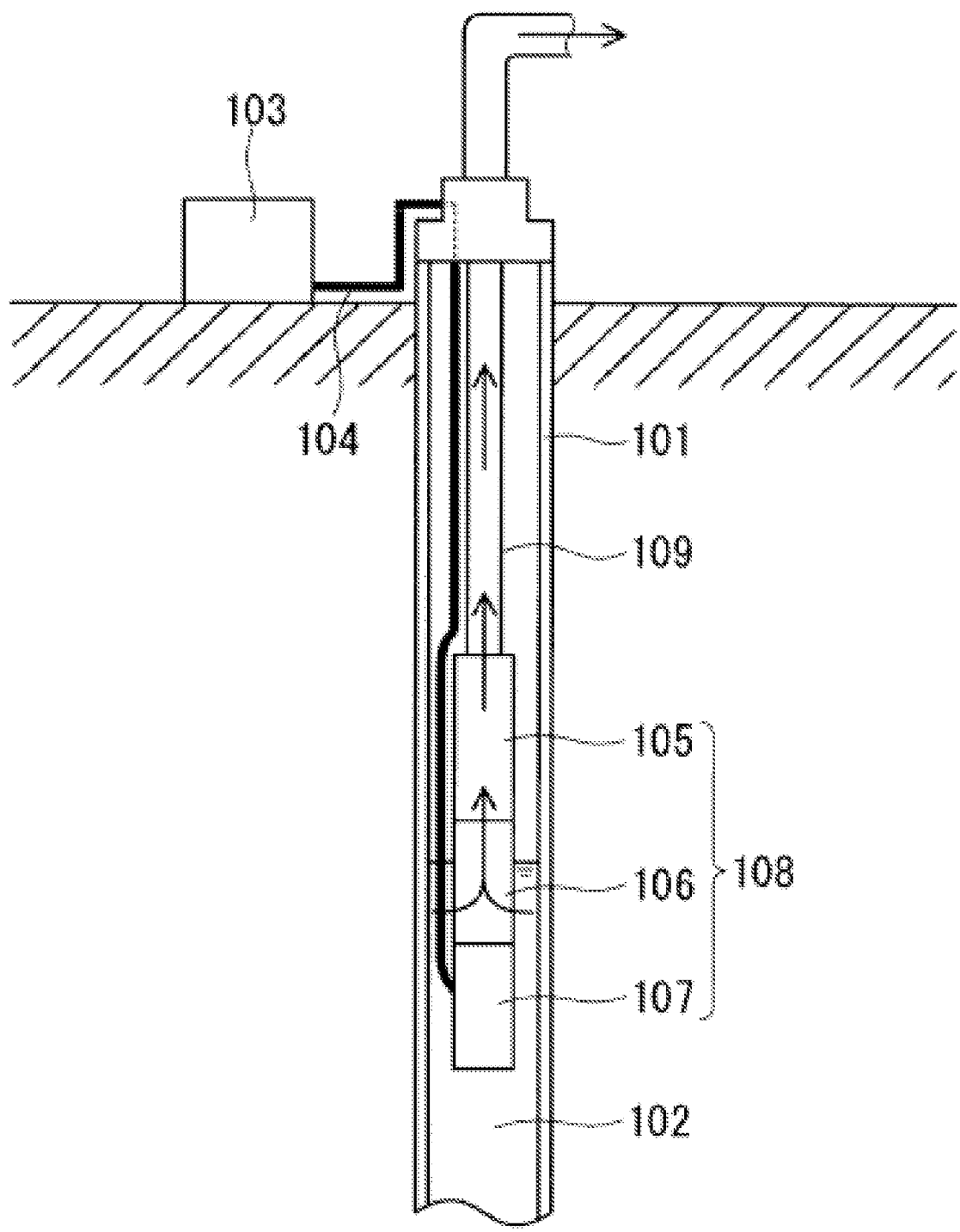
FIG. 4 is a schematic diagram for describing an ESP lift method.

The adhesive tape of the present invention may be a wound body. FIG. 3 shows an example of the adhesive tape of the present invention that is a wound body. In the wound body 51 shown in FIG. 3, a band-shaped adhesive tape 1 is wound around a winding core 52. The adhesive tape 1 may further include the separator 11. In this case, in the wound body 51, a laminate of the substrate 2, the adhesive agent layer 3, and the separator 11 is wound.

The adhesive tape of the present invention is suitable for various applications that require stably maintaining a wound state after actual winding work, for example, for repairing a power cable through which power is supplied to an ESP assembly. However, the application of the adhesive tape of the present invention is not limited to the above applications. The adhesive tape of the present invention can be used for any applications including the applications in which a conventional adhesive tape is used.

[Method for Producing Adhesive Tape]

The adhesive tape 1 can be produced, for example, by the following method.

(Preparation of Substrate 2)

The substrate 2 can be prepared, for example, by performing a surface treatment (hereinafter, referred to as an "Na treatment") on a fluorine resin sheet using a treatment liquid containing metallic sodium.

The fluorine resin sheet used for the substrate 2 is, for example, a cut sheet (skive sheet). However, the fluorine resin sheet is not limited to the cut sheet. An example of a specific production method for the fluorine resin sheet, which is a cut sheet, will be described below for the case where the fluorine resin is PTFE.

First, PTFE powder (molding powder) is introduced into a mold, and a predetermined pressure is applied to the powder in the mold for a predetermined time, thereby performing preforming. A mixture of an additive such as a coloring agent and PTFE powder may be introduced into the mold. A general powder mixer can be used to mix the additive and the PTFE powder. The preforming can be performed at ordinary temperature. The shape of the internal space of the mold is preferably columnar in order to enable cutting by a cutting lathe described later. In this case, a columnar preform and a columnar PTFE block can be obtained. Next, the obtained preform is taken out from the mold and fired at a temperature equal to or higher than the melting point (327° C.) of PTFE for a predetermined time to obtain a PTFE block. Next, a cut sheet is obtained by cutting the obtained PTFE block to a predetermined thickness. In the case where the PTFE block is columnar, it is possible to use a cutting lathe that continuously cuts the surface of the block while rotating the block, and a cut sheet can be efficiently obtained. In addition, with the cutting lathe, it is relatively easy to control the thickness of a cut sheet to be formed, and it is also possible to obtain a band-shaped cut sheet.

The thickness and the shape of the fluorine resin sheet can be selected in accordance with the thickness and the shape of the substrate 2 to be prepared.

The Na treatment on the fluorine resin sheet may be performed on a surface that is to be the back surface when the adhesive tape 1 is produced. A high own-backside adhesive strength after the friction test can be achieved by improving the adhesion of the back surface through the Na treatment. In addition to the Na treatment, a physical treatment such as a sputter etching treatment is known as an adhesion-improving treatment for the surface of the fluorine resin sheet. However, in the case of adhesion improvement by a physical treatment, a high value of the own-backside adhesive strength before the friction test is achieved, but the own-backside adhesive strength greatly decreases due to the friction test. Thus, it is difficult to achieve a high own-backside adhesive strength after the friction test by a physical treatment. It is inferred that this is because the state of the sheet surface that causes an adhesion improvement is different between the fluorine resin sheet after the Na treatment and the fluorine resin sheet after a physical treatment.

The adhesion-improving treatment may be performed on the surface 4, of the fluorine resin sheet, on which the adhesive agent layer 3 is disposed when the adhesive tape 1 is produced. The adhesion-improving treatment can improve the joining property between the substrate 2 and the adhesive agent layer 3, so that sufficient adhesive strength during use in various applications can be ensured more reliably. The adhesion-improving treatment on the surface 4 may be an Na treatment or may be a physical treatment. The Na treatment is preferable since the Na treatment can be performed simultaneously with an adhesion-improving treatment on the surface that is to be the back surface. An Na treatment on both surfaces can be performed, for example, by immersing the fluorine resin sheet into a treatment liquid containing metallic sodium.

Examples of the treatment liquid for the Na treatment include an ammonia solution of metallic sodium, and a tetrahydrofuran solution of a metallic sodium/naphthalene complex. As the treatment liquid, a commercially available treatment liquid (for example, FluoroBonder (registered trademark) manufactured by Technos Corporation) can also be used.

(Formation of Adhesive Agent Layer 3)

The adhesive agent layer 3 can be formed, for example, by applying a silicon-based adhesive agent composition to the surface 4 of the substrate 2 and drying and/or curing the applied adhesive agent composition. Known methods can be used for the application, drying, and curing of the silicone-based adhesive agent composition.

The laminate of the substrate 2 and the adhesive agent layer 3 obtained by forming the adhesive agent layer 3 may be used as it is as the adhesive tape 1, or may be used as the adhesive tape 1 after a predetermined further step is performed thereon. Examples of the further step include placing the separator 11 on the adhesive surface 5 and winding on the winding core 52.

EXAMPLES

Hereinafter, the present invention will be described more specifically by way of Examples. The present invention is not limited to the following Examples.

First, methods for evaluating the characteristics of adhesive tapes produced in the Examples will be described.

[Ordinary Temperature Adhesive Strength]

The ordinary temperature adhesive strength of each adhesive tape was measured according to "Method 1" in the adhesive strength test method specified in JIS Z0237: 2009. However, the measurement was performed under the conditions described below.

RTC-1310A manufactured by ORIENTEC CORPORATION was used as a tensile tester.

The width of a test piece was set to 19 mm, and the length of the test piece was set to 250 mm.

The number of times of reciprocation of a roller for pressure-bonding the test piece to a test plate was set to one time.

For the purpose of improving the measurement accuracy, after the test piece was pressure-bonded by the roller, the test piece was left at 25° C. for 20 to 40 minutes before a peeling test was performed.

[High Temperature Adhesive Strength]

The high temperature adhesive strength of each adhesive tape was measured according to "Method 1" in the adhesive strength test method specified in JIS Z0237: 2009. However, the measurement was performed under the conditions described below.

RTC-1310A manufactured by ORIENTEC CORPORATION and having a measurement chamber capable of being maintained at 250° C. was used as a tensile tester.

The width of a test piece was set to 19 mm, and the length of the test piece was set to 250 mm.

The number of times of reciprocation of a roller for pressure-bonding the test piece to a test plate was set to one time.

For the purpose of improving the measurement accuracy, after the test piece was pressure-bonded by the roller, the test piece was left at 25° C. for 20 to 40 minutes before the temperature was increased to 250° C.

After the test piece was left, the test piece and the test plate were set in the measurement chamber (set to 250° C.) of the tensile tester, and a peeling test was started. In order to sufficiently raise the temperatures of the test piece and the test plate, the peeling test was started about 5 minutes after the test piece was set in the measurement chamber.

[Own-Backside Adhesive Strength]

The own-backside adhesive strength of each adhesive tape was measured according to "Method 2" in the adhesive strength test method specified in JIS Z0237: 2009. However, the measurement was performed under the conditions described below. In addition, the own-backside adhesive strength of each adhesive tape was measured at times before and after a friction test.

RTC-1310A manufactured by ORIENTEC CORPORATION was used as a tensile tester.

The width of a test piece was set to 19 mm, and the length of the test piece was set to 250 mm.

The number of times of reciprocation of a roller for pressure-bonding the test piece to a test plate was set to one time.

The own-backside adhesive strength after the friction test was measured by using the adhesive tape after the friction test as the first test piece specified in "Method 2" without peeling the adhesive tape from a fixing plate used in the friction test, and pressure-bonding the second test piece specified in "Method 2" to the back surface of the adhesive tape.

For the purpose of improving the measurement accuracy, after the first test piece and the second test piece were pressure-bonded to each other by the roller, the first test piece and the second test piece were left at 25° C. for 20 to 40 minutes before a peeling test was performed.

[Friction Test]

A friction test for the back surface of each adhesive tape was performed according to the test method for coefficient of friction specified in JIS K7125: 1999, under the conditions described below.

A surface measuring instrument TRIBOGEAR TYPE: 14FW manufactured by Shinto Scientific Co., Ltd., was used as a test device.

A friction element (manufactured by Shinto Scientific Co., Ltd., ASTM flat indenter, mass: 150 g) conforming to the standards of ASTM D1894 was used as a sliding piece. The shape of a contact surface, of the sliding piece, brought into contact with the back surface of the adhesive tape was a square of 63.5 mm×63.5 mm (2.5 inches×2.5 inches) conforming to the standards of ASTM D1894.

The entire contact surface of the sliding piece was covered with the single fiber cloth (cotton, for friction) specified in JIS L0803: 2011.

By placing a 50 g weight, the total mass of the sliding piece was set to 200 g.

The friction speed was set to 100 mm/min.

A fixing plate (made of stainless steel) having a smooth surface was detachably mounted on a moving table of the test device, and the adhesive tape was attached to the surface of the mounted fixing plate. Then, a friction test was performed on the back surface of the adhesive tape on the fixing plate. When attaching the adhesive tape to the fixing plate, force was applied perpendicularly to the back surface of the adhesive tape and as evenly as possible such that air did not enter between the fixing plate and the adhesive surface of the adhesive tape and such that the back surface of the adhesive tape was not rubbed in the surface direction by a hand or the like. When measuring the own-backside adhesive strength after the contact test, the adhesive tape was removed together with the fixing plate from the moving table.

[Heat Resistance Holding Power]

The heat resistance holding power of each adhesive tape was evaluated as a "displacement distance" according to the test method for holding power specified in JIS Z0237: 2009. However, the measurement of the displacement distance was performed under the conditions described below.

The mass of a weight was set to 200 g.

In order to prevent the adhesive tape itself from stretching in the measurement at high temperature, an adhesive tape (No. 360UL, manufactured by Nitto Denko Corporation) formed of a polyimide substrate and a silicon-based adhesive agent layer was attached to the entirety of the back surface of the adhesive tape to be evaluated.

The width of a test piece was set to 10 mm, and the length of the test piece was set to 100 mm.

The contact area between the test piece and a test plate (stainless steel plate) was set to 10 mm (width)×20 mm (length).

The number of times of reciprocation of a roller for pressure-bonding the test piece to a test plate was set to one time.

For the purpose of improving the measurement accuracy, after pressure-bonding by the roller, the test piece was left at 25° C. for 20 to 40 minutes before the temperature was increased to 250° C.

After the test piece was left, the test piece and the test plate were set in a measurement chamber (set to 250° C.) of a tensile tester, and the holding power test was started. In order to sufficiently raise the temperatures of the test piece and the test plate, the holding power test was started about 5 minutes after the test piece was set in the measurement chamber.

The displacement distance 30 minutes after the start of the test was measured and regarded as the heat resistance holding power of the adhesive tape.

[Terminal Peeling Resistance Characteristics]

The peeling resistance characteristics of the terminal portion of each adhesive tape were evaluated under each of test conditions, that is, in air at 25° C. (condition A), in air at 250° C. (condition B), and in oil at 220° C. (condition C), as described below.

A test piece having a width of 5 mm and a length of 100 mm was obtained from the adhesive tape according to the method for preparing a test piece (item 4.1) described in JIS Z0237: 2009. Next, a round bar (diameter: 3 mm) made of steel was prepared, and the test piece was wound around the round bar for two and a half turns from one end of the test piece. The winding was performed in the circumferential direction of the peripheral surface of the round bar while applying a winding tension of 50 gf to the other end of the test piece with a weight. At the time of winding, care was taken not to rub the back surface of the portion, of the test piece, to be wound around the round bar in the surface direction by a hand or the like. At the time at which the winding for two and a half turns became complete, with the above winding tension applied, the test piece was cut in the width direction thereof at an end portion of the wound portion, light force was applied perpendicularly to the surface such that the cut end portion was in close contact with the wound portion, and this end portion was regarded as a terminal portion to be evaluated for peeling resistance characteristics.

Next, the round bar around which the test piece had been wound was allowed to stand under each condition of the condition A, the condition B, or the condition C for 7 hours, and then it was visually confirmed whether or not the terminal portion of the wound test piece was peeled off. The case where the terminal portion was not peeled off was evaluated as good (○), and the case where the terminal portion was peeled off was evaluated as poor (×). As the oil, a petroleum-based hydrocarbon oil (manufactured by MATSUMURA OIL Co., Ltd., Therm Oil 500) was used.

Example 1

[Preparation of PTFE Sheet]

PTFE powder (POLYFLON PTFE M-12, manufactured by DAIKIN INDUSTRIES, LTD.) was introduced into a cylindrical mold and preformed under the conditions of a temperature of 23° C., a pressure of 60 MPa, and a pressure application time of 1 hour. Next, the formed preform was taken out from the mold and fired at 375° C. for 3 hours to obtain a columnar PTFE block having a height of 100 mm and an outer diameter of 50 mm. Next, the obtained PTFE block was cut by a cutting lathe to obtain a PTFE sheet having a thickness of 60 μm. In this manner, the PTFE sheet used as a substrate was prepared.

[Na Treatment on PTFE Sheet]

The prepared PTFE sheet was immersed in a treatment liquid (FluoroBonder (registered trademark) manufactured by Technos Corporation) containing metallic sodium, then pulled up, and washed with acetone. Next, the PTFE sheet was immersed in pure water for washing and then dried at 100° C. for 1 minute, thereby performing an Na treatment on both surfaces of the PTFE sheet. The immersion time of the PTFE sheet in the treatment liquid was set to 30 seconds. In this manner, a substrate made of PTFE (PTFE substrate) was obtained.

[Preparation of Silicone-Based Adhesive Agent Composition A]

100 parts by weight of dimethylpolysiloxane (weight-average molecular weight: 700,000, raw rubber) as a silicone gum and 120 parts by weight of an MQ resin (weight-average molecular weight: 7,000) as a silicone resin were mixed together with toluene. The MQ resin used was composed of 44 mol % of $(CH_3)_3SiO_{1/2}$ (M unit) and 56 mol % of $SiO_2$ (Q unit). Next, the obtained mixture was then maintained at 100 to 120° C. for 4 hours to partially condense the dimethylpolysiloxane and the MQ resin. Then, toluene was further added to adjust the solid content (non-volatile content) to obtain a silicone solution (solid content concentration: 60 weight %) composed of the dimethylpolysiloxane, the MQ resin, and a partial condensate thereof. Next, 1.4 parts by weight of a xylene solution of benzoyl peroxide (NYPER BMT-K40, manufactured by NOF CORPORATION) was added to 100 parts by weight of the obtained silicone solution, and the mixture was diluted with toluene to obtain a silicone-based adhesive agent composition A (solid content concentration: 40 weight %).

[Production of Adhesive Tape]

The silicone-based adhesive agent composition A was applied to one main surface of the PTFE substrate such that the application thickness after drying was 30 μm, dried at 80° C. for 1 minute, and then cured at 235° C. for 1 minute to obtain an adhesive tape (thickness: 90 nm).

Example 2

An adhesive tape having a thickness of 50 μm was produced in the same manner as Example 1, except that the thickness of the PTFE sheet was changed.

Example 3

An adhesive tape having a thickness of 130 μm was produced in the same manner as Example 1, except that the thickness of the PTFE sheet was changed.

Example 4

[Preparation of Silicone-Based Adhesive Agent Composition B]

A silicone-based adhesive agent composition B (solid content concentration: 40 weight %) was obtained in the same manner as [Preparation of silicone-based adhesive agent composition A] in Example 1, except that the amount of the MQ resin to be mixed with dimethylpolysiloxane was set to 150 parts by weight per 100 parts by weight of dimethylpolysiloxane.

An adhesive tape was produced in the same manner as Example 1, except that the adhesive agent composition to be applied to the PTFE substrate was changed to the silicone-based adhesive agent composition B.

Comparative Example 1

An adhesive tape was produced in the same manner as Example 1, except that the Na treatment was not performed on the PTFE sheet.

Comparative Example 2

An adhesive tape was produced in the same manner as Example 1, except that a sputter etching treatment was performed on the PTFE sheet instead of the Na treatment. The sputter etching treatment was performed under the following conditions.

Argon gas was used as the sputtering gas.

The degree of vacuum during sputter etching was set to 10 Pa.

The power density was set to 1.5 W/cm², and the sputtering time was set to 10 seconds.

Table 1 below shows the respective characteristics of the adhesive tapes produced in Examples 1 to 4 and Comparative Examples 1 and 2.

TABLE 1

|  | Example 1 | Example 2 | Example 3 | Example 4 | Comparative Example 1 | Comparative Example 2 |
|---|---|---|---|---|---|---|
| Surface treatment on PTFE substrate | Na treatment | Na treatment | Na treatment | Na treatment | Not performed | Sputter etching treatment |
| Adhesive agent composition | A | A | A | B | A | A |
| Thickness (μm) | 90 | 50 | 130 | 90 | 90 | 90 |
| Ordinary temperature adhesive strength (N/19 mm) | 6.0 | 5.8 | 6.2 | 6.0 | 6.0 | 6.0 |
| High temperature adhesive strength (N/19 mm) | 1.5 | 1.5 | 1.6 | 1.0 | 1.5 | 1.5 |
| Own-backside adhesive strength before friction test (N/19 mm) | 5.0 | 4.8 | 5.2 | 5.0 | 2.5 | 7.5 |
| Own-backside adhesive strength after friction test (N/19 mm) | 5.0 | 4.8 | 5.2 | 5.0 | 2.5 | 3.4 |
| Own-backside adhesive strength maintenance rate (%) | 100 | 100 | 100 | 100 | 100 | 45.3 |
| Heat resistance holding power (mm) | 0.15 | 0.15 | 0.15 | 0.70 | 0.15 | 0.15 |

TABLE 1-continued

|  |  | Example 1 | Example 2 | Example 3 | Example 4 | Comparative Example 1 | Comparative Example 2 |
|---|---|---|---|---|---|---|---|
| Terminal peeling resistance characteristics | In air at 25° C. | ○ | ○ | ○ | ○ | ○ | ○ |
|  | In air at 250° C. | ○ | ○ | ○ | x | x | ○ |
|  | In oil at 220° C. | ○ | ○ | ○ | x | x | ○ |

INDUSTRIAL APPLICABILITY

The adhesive tape of the present invention is suitable for various applications that require stably maintaining a wound state after actual winding work, for example, for repairing a power cable through which power is supplied to an ESP assembly.

The invention claimed is:

1. An adhesive tape comprising: a substrate made of a fluorine resin; and a silicone-based adhesive agent layer disposed on one surface of the substrate, wherein
   a surface of the silicone-based adhesive agent layer which is opposite to a substrate side surface of the layer forms an adhesive surface,
   the adhesive tape has a thickness of 50 μm or more,
   an adhesive strength of the adhesive surface to the other surface of the substrate after a friction test is 4.0 N/19 mm or more, and
   the friction test is performed according to a test method for coefficient of friction specified in JIS K7125: 1999, and performed in a state where:
      a contact surface, of a sliding piece used in the test method, brought into contact with a surface to be tested is covered with a single fiber cloth (cotton, for friction) specified in JIS L0803: 2011;
      the other surface of the substrate is defined as the surface to be tested; and
      the number of times of reciprocation is set to 10 times.

2. The adhesive tape according to claim 1, wherein the fluorine resin is polytetrafluoroethylene.

3. The adhesive tape according to claim 1, further comprising a separator, wherein
   the separator is laminated on the substrate and the silicone-based adhesive agent layer so as to be in contact with the adhesive surface.

4. The adhesive tape according to claim 1, wherein the adhesive tape is a wound body.

5. The adhesive tape according to claim 1, wherein the other surface of the substrate is subjected to a sodium treatment, and
   the sodium treatment is a surface treatment using a treatment liquid containing metallic sodium.

6. The adhesive tape according to claim 1, wherein the other surface of the substrate includes at least one functional group selected from hydroxyl group, carboxy group and carbonyl group.

7. The adhesive tape according to claim 1, wherein the substrate includes a material having an electric resistivity of $10^5$ Ω·cm or more.

8. The adhesive tape according to claim 1, wherein the substrate includes a material having an electric resistivity of $10^{12}$ Ω·cm or more.

* * * * *